Feb. 5, 1924.
F. M. HOWE
1,482,747
SPRAYING OUTFIT
Filed Nov. 26, 1921  2 Sheets-Sheet 1
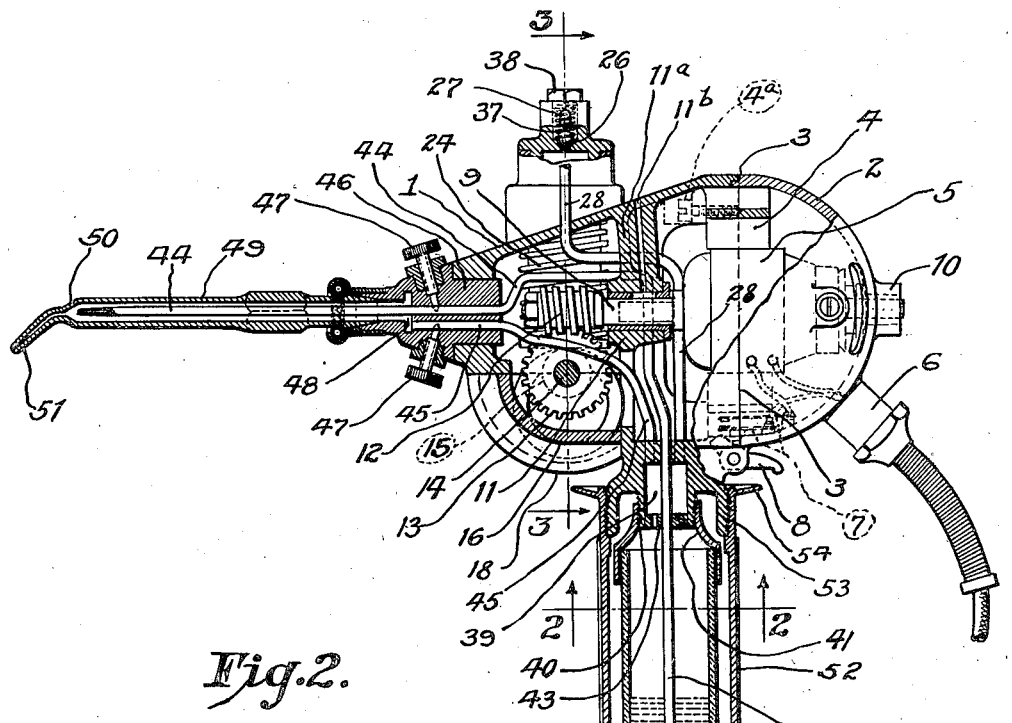
INVENTOR.
FRANK MORGAN HOWE
BY
*Sheffield & Betts*
ATTORNEYS.

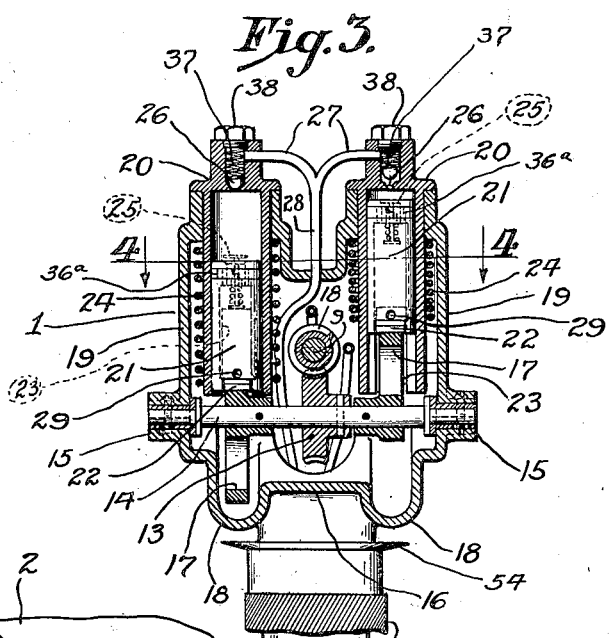
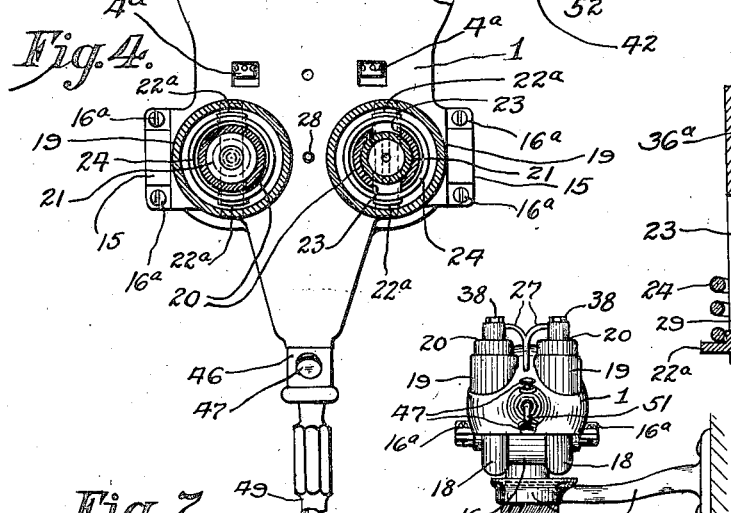
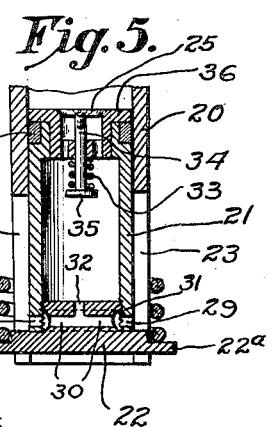
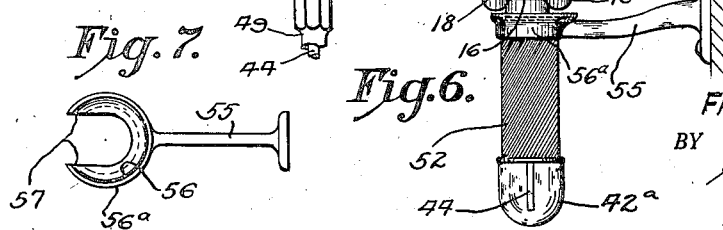
INVENTOR.
FRANK MORGAN HOWE
BY
ATTORNEYS.

Patented Feb. 5, 1924.

1,482,747

UNITED STATES PATENT OFFICE.

FRANK MORGAN HOWE, OF NEW YORK, N. Y.

SPRAYING OUTFIT.

Application filed November 26, 1921. Serial No. 518,003.

*To all whom it may concern:*

Be it known that I, FRANK MORGAN HOWE, a citizen of the United States of America, and resident of the city, county, and State of New York, have invented certain new and useful Improvements in Spraying Outfits, of which the following is a description.

My invention relates to motor driven units and has as one of its objects the provision of a motor driven unit of sufficiently light weight to be carried in the hand when desired and which is adapted to spray liquids, including oils, and powders. A further object of my invention is to provide a compact and efficient motor operated unit of light construction and adapted for use either as an atomizer or for compressing air for blast lamps, blowpipes, or similar purposes.

The novel features of my invention are particularly pointed out in the appended claims. The invention itself, however, with further objects and advantages will best be understood from the following description taken in connection with the accompanying drawings, in which—

Fig. 1 is a central vertical section of a machine according to my invention, parts being shown in elevation and parts being broken away for purposes of illustration.

Fig. 2 is a section on the line 2, 2 of Fig. 1 looking in the direction of the arrows.

Fig. 3 is a section on the line 3, 3 of Fig. 1 looking in the direction of the arrows.

Fig. 4 is a section on the line 4, 4 looking in the direction of the arrows.

Fig. 5 is a detail section through a portion of a cylinder of a machine illustrated in the preceding figures.

Fig. 6 is a front elevation of the machine illustrated in Figs. 1 to 4, inclusive, as it appears when supported on the bracket according to my invention.

Fig. 7 is a plan view of the bracket illustrated in Fig. 6.

In the drawing, 1 is a casing the forward portion of which is generally conical in outline and the rear portion 2 of which is hemispherical, part 2 being united to the body of the casing along the line 3. Part 2 has interior lugs 4 which overlap the inner face of the rear end of the main body of the casing, the two parts of the casing being held together by screws $4^a$ which extend inwardly from sockets opening from the face of the body of the casing. Supported by the lugs 4 is an electric motor 5 the wires for which are brought into the casing through the boss 6 on the member 2 of the casing, the flow of current to the motor 5 being controlled by a switch 7 which is illustrated in Fig. 1 in dotted lines, a closing of the switch being controlled by a thumb lever 8 pivoted to the casing and extending therethrough into contact with one portion of the switch. The switch 7 is of the spring type and automatically opens when released by the thumb lever 8. The motor 5 may thus be started and stopped when desired by operating member 8.

The shaft 9 of motor 5 is arranged along the axis of the conical part of the casing 1 and I provide a rear bearing for the shaft 9 in the boss 10 on part 2 of the casing and a forward bearing 11 supported by a web $11^a$ within the casing, an oil hole $11^b$ being placed in web $11^a$. Fixed on shaft 9 forward of the bearing 11 is a worm 12 which meshes with the worm wheel 13 on a transverse shaft 14, shaft 14 being mounted in bearings 15, 15 formed partly in casing 1 and partly in removable cap 16 normally held to casing 1 by screws $16^a$, $16^a$. Fixed on shaft 14, one on each side of the worm wheel or gear 13 are two eccentrically mounted cams 17, 17, the cap 16 being enlarged as illustrated at 18, 18 to provide room for the cams 17 when they swing below the shaft 14. Above the shaft 14 and the planes of cams 17 the casing 1 is enlarged to form hollow bosses 19, 19 within which are mounter cylinders 20, 20 open at the lower ends, having hollow pistons 21, 21 therein for air compressing purposes. The lower ends of pistons 21 have threaded therein combined heads and shoes 22, 22 which are adapted to bear against the faces of the cams 17 and which work in slots 23, 23 extending upwardly from the lower edges of the cylinders 20 in the planes of the cams 17. The shoes 22 have projections $22^a$ at each end which extend beyond the outer surface of cylinders 20 and surrounding the cylinders 20 are springs 24, 24 which bear against the shoes 22 at one end and against the inner face of bosses 19 at the other, the inner face of the bosses 19 of casing 1 being spaced from the outer surface of the cylinders 20 to provide room for springs 24. It will be apparent that pistons 21 are thrown upwardly by the cams 17 and returned downwardly by springs 24.

The pistons 21 are hollow and carry at their upper ends inlet valves 25, which open on the down stroke of pistons 21. On the upstroke of the pistons 21 the air is forced out of the cylinders through valves 26, 26 into the heads of the cylinders 20 and into the outlet ducts 27, 27 which are united to form the pressure air duct 28. Air thus forced out of the cylinders is previously admitted beneath the inlet valve 25 through holes 29, 29 in the lower ends of cylinders 21, holes 29 opening into grooves 30, 30 in the inner face of the heads 22, air being admitted from the grooves 30 into the interior of pistons 21 through connecting passages 31, 31 and 32. At the termination of the downstroke of pistons 21 valves 25 are seated quickly by means of springs 33 which are assembled in compression around the stems 34 of valves 25 between the collars 35 on the valve stems and the heads 36 of pistons 21. Preferably, I provide piston rings $36^a$ mounted in grooves in pistons 21 and held in place by the heads 36. The outlet valves 26 are normally held seated by springs 37, these springs being held in place by caps 38 which thread into the recesses in the heads of cylinders 20 and in which the springs 37 and valves 26 are placed.

The air duct 28 leads to a chamber 39 formed in the base of casing 1. The wall of chamber 39 at the lower end of the chamber projects from the casing and is threaded as shown at 40 to receive threaded collar 41 which supports the chamber 42 which acts as either a liquid or an air reservoir, depending upon the use to which the apparatus is put. Across the lower end of chamber 39 is placed an apertured web 43 which serves as a guide for the liquid conduit 44 but which permits the free passage of air in either direction due to the apertures $44^a$ therein. From chamber 39 leads an air duct 45. As clearly shown in Fig. 1, liquid duct 44 and air duct 45 pass through a lug 46 seated in an aperture in the forward portion of casing 1, the valves 47, 47 being provided to regulate the flow of fluid through these ducts as desired. The duct 45 connects at its outer end with a chamber 48 in the forward end of lug 46. When the apparatus is being used as an atomizer, chamber 48 is extended by a tube 49 which is releasably held in place by means well known in the atomizer art. The duct 44 extends centrally through the tube 49 to a point near the outer end of tube 49 at which the outer tube is reduced as illustrated at 50 forming a restricted spray nozzle 51 of well known type.

Surrounding the chamber 42 is a handle 52 which is threaded to a collar 53 which depends from the lower portion of the casing 1, surrounding and being spaced from the lower wall 40 of the chamber 39. The upper end of handle 52 is formed into an upwardly flaring collar 54 which forms a convenient bearing for the hand when the apparatus is so held and also forms a convenient support for the apparatus when it is desired to place the same on a mechanical support. For this purpose the axis of the handle should pass through or very close to the center of gravity of the complete apparatus.

I have found that it is often desirable to use the apparatus according to my invention under circumstances which require the use of both the operator's hands and I have provided a bracket 55 the outer end of which is formed into a cup-like socket 56, the diameter of which is sufficient to receive the collar 54 previously mentioned, but which is cut away as illustrated at 57 to provide an opening through which the handle 52 may pass so that the vertical axis of the handle coincides with the center of the socket 56. The apparatus may thus be passed over the socket 56 and lowered downwardly so that the collar 54 rests in the socket as illustrated in Fig. 6. The apparatus may then be turned in any direction desired in the horizontal plane and also may be readily removed from socket merely by lifting it up by handle 52. It will be seen that the rim of the socket member 56 is raised so as to enclose the collar 54 when the apparatus is held by the bracket, the rim $56^a$ and the cut-away portion 57 of the bracket thus cooperating with the collar 54 and handle 52 somewhat after the fashion of the bayonet joint.

I prefer to enlarge the lower end of the receptacle 42 so as to provide greater capacity than would otherwise be had except by unduly extending the chamber 42. Chamber 42 has been made transparent so that the presence and character of liquid therein may be readily determined when it is wished to use the apparatus as an atomizer.

An apparatus of the character disclosed herein may be used for spraying any of the liquids, including oils, and powders now employed by the medical and dental professions and I find also that it may be employed to supply air to the blast lamp or blowpipes for cleaning teeth or other like purposes. In this connection it will be understood that the processes of atomizing liquids, especially certain oily liquids ordinarily employed in spray form, require a considerable air pressure so that the provision of the necessary means for spraying these liquids by compressed air automatically provides air of sufficient pressure for many other purposes, such as those just mentioned. In this connection, it is emphasized that the requirements for apparatus of the type herein disclosed imposed rigid limitations upon the design in order that the apparatus may be light enough to conveniently hold in the hand and at the same time supply a sufficient quantity of air at high enough pressure to give a good spray, this pressure ordinarily being 30 lbs. or more.

It will be seen that I have provided an apparatus which can be employed for a wide variety of uses by the medical, dental and veterinary professions and that it may also be employed by non-professional persons for home treatment of nose, throat and teeth, etc.

Having thus described my invention, I claim:

1. A hand portable machine comprising a casing having a depending handle, a motor mounted in said casing at one side of the axis of said handle, and an air compressing mechanism mounted in said casing at the other side of said handle.

2. A hand portable unit comprising a casing having a depending handle, a motor mounted in said casing at one side of the axis of said handle, a shaft for said motor, an air compressing mechanism mounted in said casing on the other side of the axis of said handle from said motor and driven from said shaft, and a bearing for said shaft intermediate said motor and the part of said shaft from which said air compressing means is driven.

3. In an air compressor, a casing, a cylinder supported in said casing and spaced therefrom for a portion of its length, a piston in said cylinder, a spring surrounding said cylinder for moving said piston, means on said piston which receives the thrust of said spring, and cam means for moving said piston against said spring.

4. In an atomizer, a cylinder, an air compressing piston in said cylinder, a shoe on said piston, a spring surrounding said cylinder and bearing against said shoe, said cylinder having a slot therein in which said shoe travels, and a cam bearing against said shoe for moving said piston against said spring.

5. An atomizer adapted to be held in the hand comprising in combination a casing, having a hollow handle thereon, a reservoir for liquid within said handle, a motor driven air compressing means within said casing, a nozzle on said casing, and means whereby air from said compressing means and liquid from said reservoir may create a spray from said nozzle.

6. An atomizer adapted to be held in the hand comprising in combination a casing, having a hollow handle thereon, a reservoir for liquid within said handle, a motor driven air compressing means within said casing, a nozzle on said casing, and means whereby air from said compressing means and liquid from said reservoir may create a spray from said nozzle, said reservoir being transparent and projecting from said handle.

7. A hand portable spraying unit comprising a casing having a transverse division, a motor supported in one part of said casing and having an armature shaft, said shaft having a bearing at one end in the outer shell of said casing, a bearing for said shaft in said transverse division, an air compressing means within said casing on the opposite side of said division from said motor and driving connections between said compressing means and said shaft.

8. A hand portable unit comprising in combination a divided casing one part of which is of hemispherical form and the other part of which is substantially conical, and motor mounted in said hemispherical part and having an armature shaft extending in the said conical part, and bearing for said armature in said conical part, said conical part having hollow projections or bosses in which compressor cylinders are mounted, and driving connections between said shaft and pistons in said cylinders.

9. A hand portable motor unit comprising in combination a casing, a motor driven compressor in said casing and a depending handle on said casing having a flaring collar thereon from which said casing may be supported either in the hand or in a bracket.

10. The combination of a light weight hand portable motor driven unit having a casing, a handle depending from said casing and having a collar thereon near its upper end and a bracket having means forming a socket to receive said collar, said means being cut away to receive said handle.

11. A light weight hand portable motor unit comprising a casing, a motor driven air compressor in said casing and a depending handle fixed to said casing, the axis of said handle passing substantially through the center of gravity of the unit.

12. A hand portable sprayer comprising in combination a casing having a handle, a motor mounted in said casing at one side of the vertical axis through the center of gravity of the device, and an air compressing mechanism mounted in said casing at the other side of said axis, said axis passing substantially through the center of said handle.

FRANK MORGAN HOWE.